United States Patent [19]

Stengel

[11] 3,957,257

[45] May 18, 1976

[54] HARDENING APPARATUS WITH A HARDENING TANK, ESPECIALLY IN HARDENING MACHINES FOR CRANKSHAFTS

[75] Inventor: Edgar Stengel, Wuppertal-Hahnerberg, Germany

[73] Assignee: AEG-Elotherm G.m.b.H., Remscheid, Germany

[22] Filed: June 26, 1974

[21] Appl. No.: 483,453

[30] Foreign Application Priority Data

Aug. 30, 1973 Germany............................ 2343684

[52] U.S. Cl. ............................................... 266/133
[51] Int. Cl.² ........................................... C21D 1/66
[58] Field of Search .................. 266/4 R, 4 A, 4 EI, 266/6 R, 6 PC; 148/146, 150, 153; 219/10.57, 10.67, 10.71, 10.73

[56] References Cited

UNITED STATES PATENTS

| 2,787,566 | 4/1957 | Seulen et al. ...................... 148/146 |
| 2,812,870 | 11/1957 | Corteggiano et al............ 266/4 R X |
| 3,240,480 | 3/1966 | Cary.................................. 266/4 EI |

*Primary Examiner*—Gerald A. Dost
*Attorney, Agent, or Firm*—Cushman, Darby & Cushman

[57] ABSTRACT

An improved hardening apparatus of the type having a main carrier shaft which mounts pairs of indexing spiders which hold workpieces during treatment which includes quenching in a bath. The shaft is developed hollow and provided with a spur gear near one end which functions as a sunwheel of planetary gears. The hollow shaft is provided with perforations in the area of the spur gear through which it extends to engage the tailstock gear which is flanged to the housing surrounding the shaft.

1 Claim, 1 Drawing Figure

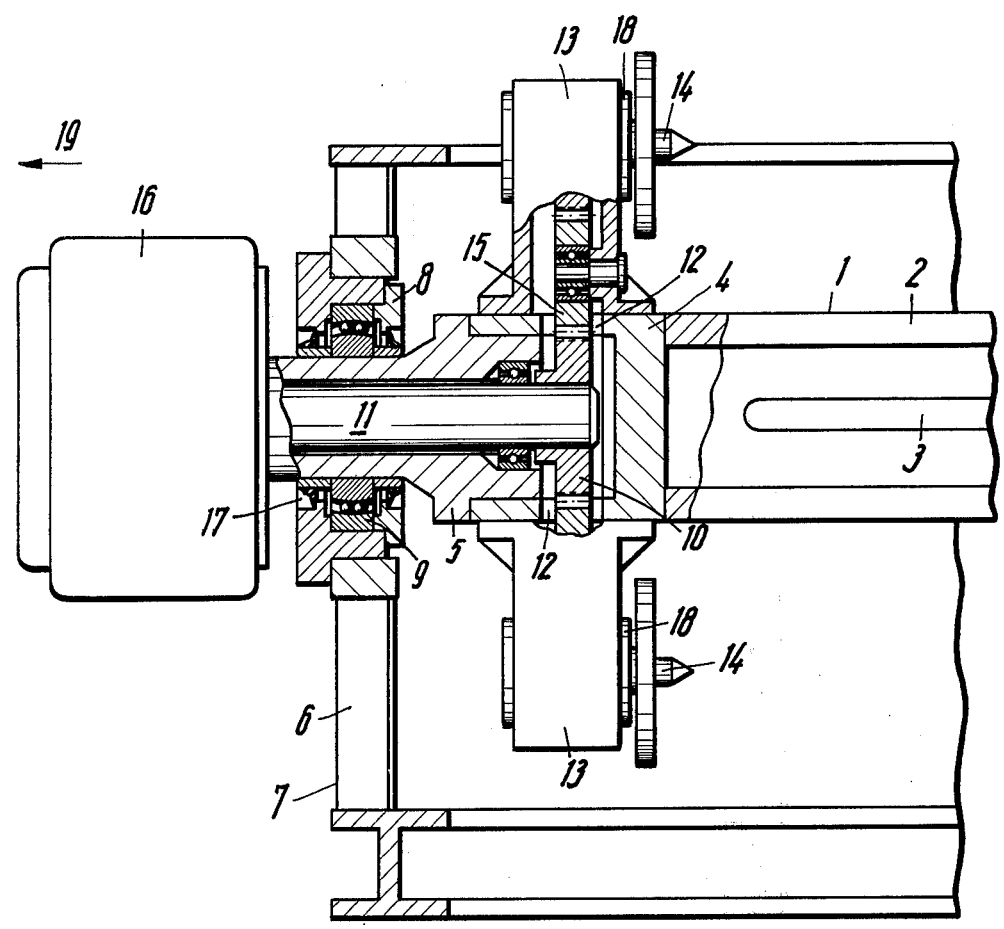

HARDENING APPARATUS WITH A HARDENING TANK, ESPECIALLY IN HARDENING MACHINES FOR CRANKSHAFTS

This invention concerns a hardening apparatus with a hardening tank which is used particularly advantageously as the part of a crankshaft hardening machine.

A hardening apparatus of this type for so-called semiautomatic crankshaft hardening machines, as known for example from the U.S. Pat. No. 3,240,480, has a hardening tank in which a carrier shaft which is prismatic at least over the greatest part of its length, is mounted rotatably with a horizontal axis. This carrier shaft has a pair of carrier spiders which serve for the simultaneous clamping of several workpieces each having a rotational axis at their ends in order to turn these workpieces around their axes as well as for the conveyance of the workpieces into or from the bath holding quenching means of the hardening tank. At the same time, the carrier shaft is arranged such that each time one pair of clamping elements is located outside of the bath holding the quenching means, in which position the completely finished workpiece is taken from the chucking elements, workpieces which have to be newly hardened are clamped down or the workpieces are inductively heated. If the pair of carrier spiders has four pairs of chucking elements, as is the case, for example, in the apparatus according to the above mentioned U.S. Pat. No. 3,240,840, a drive of the carrier shaft will bring about its partial turns of each time 90°. One of the carrier spiders is equipped with a planetary gear with the help of which the chucking elements can be turned with the workpieces around the axes of said workpieces.

For the inductive heating of the workpieces, for example, of crankshafts, the crankshafts are first put into rotary movement and after that a so-called half-shell inductor, which is guided along a parallelogramic bar structure, in order to carry out movements of translation, is placed by the operator onto the surface area of the workpiece that is to be hardened and the inductor current then is turned on. After inductive heating has been completed, the inductor is lifted off and the carrier shaft is turned by 90° as a result of which the just heated crankshaft, which continues to rotate between the chucking elements, is lowered into the bath of quenching means in the hardening tank for the purpose of quenching.

In the case of the hitherto customary constructions of the carrier shaft-carrier spider unit, sealing against leakage of the quenching agent liquid into the bearing places of the arrangement has caused quite considerable difficulties. Also, in the case of these constructions, in most cases no easy insertion or expansion possibilities exist for the carrier shaft.

The invention is based on the task of suggesting a hardening arrangement with a hardening tank of the above-mentioned type, in the case of which the carrier shaft can be inserted or disassembled particularly easily and has only a small number of sealing places between the parts rotating in relation to one another, and in the case of which a large number of individual elements of the apparatus remain the same, whether or not the number of pairs of chucking elements provided on the pair of carrier spiders differs from the usual four, whether or not 1, 2 or 3 or 5 pairs of chucking elements are provided on the pair of carrier spiders.

The problem is solved in the hardening arrangement according to the invention whereby the carrier shaft is hollow and in it and close to its ends a driving shaft, provided with a spur gear as a sun wheel of the planetary gear, is mounted concentrically. In the area of this spur gear and on the flat surfaces of the partial casing, the wall of the prismatic, hollow carrier shaft has perforations and above each of these perforations a housing-shaped partial tailstock for driving has been flanged on to these flat surfaces of the partial casing enclosing the perforations. This casing carries a workpiece chucking element driveable for the purpose of rotation, and includes as well a driving gear for its drive, whereby a gear acting as a planetary gear engages with the spur gear serving as a sun wheel through the perforation in the wall of the carrier shaft.

The invention will be explained in detail subsequently on the basis of the FIGURE which shows a partial longitudinal cut of the hardening apparatus with the end of the carrier shaft on the driving side with one of the carrier spiders or the mounting of the corresponding end of the carrier shaft in the hardening tank. The mounting at the other end of the carrier shaft and of the other end of the carrier spider, which consists of several tailstocks clamped on to the flat casing surfaces of the carrier shaft, is developed as described in FIG. 1 of the U.S. Pat. No. 2,787,566; therefore, its illustration in the FIGURE is omitted.

Carrier shaft 1 consists over the greatest part of its length of a hollow pipe 2 with a square cross-section and relatively great wall thickness. Pipe 2, on its flat partial casing surfaces, has dovetailed grooves 3 extending in the longitudinal direction which serve for clamping down the tailstocks (not shown in the FIGURE) of the second carrier spider. A coupling bushing 4 is welded to pipe 2 so that the square outside contour of bushing 4 continues the contour of square pipe 2. In coupling bushing 4, a bearing bolt 5 provided with a central bore is attached. Bolt 5 which functions as a drive shaft is mounted in an antifriction bearing 9, provided with a sealing housing 8, and embedded in a side wall 6 of hardening tank 7 whereby a driving shaft 11 connected with a spur gear 10 is mounted in the central bore of bearing bolt 5. Coupling bushing 4 in the area of the spur gear 10 has perforations 12 on its outside flat jacket surfaces, whereby on the flat surface area of the coupling bushing 4 enclosing each perforation 12, a housing-shaped driving tailstock 13 is attached. Each tailstock 13 contains a rotatably mounted tailstock sleeve 14 for holding a workpiece as well as a driving gear for driving that tailstock sleeve, which engages by way of a gear 15 which reaches through the perforation 12 in the coupling bushing 4 with spur gear 10 of driving shaft 11.

The bearing bolt 5 and the driving shaft 11 are driven in a manner known per se and independently of one another by a gear unit indicated by 16 in the FIGURE. At the same time, the rotary speed of the tailstock sleeves 14 is proportional to the difference of the rotary speeds of carrier shaft 1 and driving shaft 11 since the driving arrangement constitutes a planetary gear with the spur gear 10 as a sun wheel and the gears 15 as planetary gears. Effective packings against admission of quenching agent liquid are required only at points 17 and 18 for this apparatus.

The driving tailstocks 13 or the headstocks of the second carrier system (not shown in the FIGURE) are removed for the purpose of removing of the carrier shaft 1. The attachment of the bearing 8 and 9 in the lateral wall 6 of the hardening tank 7 is released, and after that the carrier shaft 1 with the bearings 8 and 9 is pulled out in the direction of arrow 19 through the seat of the bearing. A treatment of the bearing places of the shaft can be accomplished together in a clamping of a bench lathe, since its cross-section without the driving tailstocks or headstocks being put on, is relatively small, as a result of of which a chatter of the carrier shaft can be avoided from the very beginning in a simple manner.

For hardening arrangement according to the invention, it is possible to set up carrier spiders furthermore with a variable number of pairs of clamping elements with the driving tailstocks described. Shafts with a square cross-section cannot be armed completely with pairs of clamping elements each consisting of a driving tailstock and a headstock. However, different numbers of pairs can be used with, for example, a prismatic shaft with a cross-section which is not square but approximates, for example, a regular triangle or a pentagon. Since hardening arrangements of this type are almost never serially produced, the parts of the arrangement, for example, the driving tailstocks and headstocks, which are expensive and remain the same for all variations, can be kept in stock in relatively small numbers and thus the storage costs can be kept relatively low.

Many changes and modifications in the above-described embodiment of the invention can, of course, be carried out without departing from the scope thereof. Accordingly, that scope is intended to be limited only by the scope of the appended claims.

What is claimed is:

1. In a hardening apparatus of the type including a hardening tank for containing a liquid up to a selected level in said tank, a carrier shaft having a longitudinal axis, said shaft being horizontally mounted in said tank to be rotatable about its longitudinal axis, bearing means removably mounted in an opening in the side of said tank for rotatably mounting a hollow drive shaft extending through said opening, said carrier shaft having a pair of carrier spiders for turning the workpieces around their respective axes and for simultaneously clamping down several workpieces each having its own rotational axis, drive means mounted outside of said tank side wall and coupled to said hollow drive shaft for producing partial turns of said carrier shaft, a gear driving shaft disposed within said hollow drive shaft and coupled at one end thereof to said drive means and at its other end to a sun gear for turning said carrier spiders by way of a planetary gear disposed in each said carrier spider, the improvement wherein said carrier shaft is hollow and at one end is connected to said hollow drive shaft, said sun gear on said gear driving shaft is disposed within said hollow carrier shaft, said carrier shaft has perforations adjacent the edge of said sun gear, said carrier shaft has flat surfaces and a said carrier spider including a housing-shaped tailstock removably mounted on said flat surfaces over each said perforation, each said tailstock carrying therewithin a said planetary gear engaging said sun gear through a said perforation, each said tailstock further including a gear unit drivingly connected to a clamping element, said carrier shaft having exterior dimensions smaller than said opening in said sidewall of said tank so that, when said tailstock and said bearings are removed, said carrier shaft can be moved through said opening in the side of said tank.

* * * * *